July 11, 1933.　　　M. C. BERSTED　　　1,917,216
SPRINKLING NOZZLE
Filed March 5, 1930
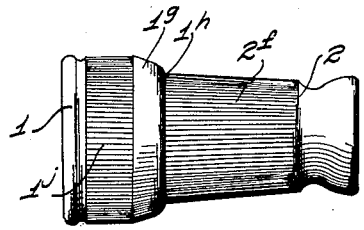
INVENTOR.
MARTIN C. BERSTED
BY
A.B.Bowman
ATTORNEY Patented July 11, 1933

1,917,216

UNITED STATES PATENT OFFICE

MARTIN C. BERSTED, OF SAN DIEGO, CALIFORNIA

SPRINKLING NOZZLE

Application filed March 5, 1930. Serial No. 433,272.

My invention relates to sprinkling nozzles, and the objects of my invention are:

First, to provide a nozzle of this class in which both the volume of water and the nature of delivery may be varied to suit conditions of use;

Second, to provide a nozzle of this class which when not in use may function as an effective valve so as to seal the end of the hose to which it is connected;

Third, to provide a nozzle of this class in which the pressure of water within the hose to which the nozzle is connected tends to close the valve member, that is, the pressure is upon the head of the valve member so that the water tends to further seal the valve rather than leak past;

Fourth, to provide a nozzle of this class in which the sealing valve may be readily removed for replacement without disturbing the remaining parts of the nozzle;

Fifth, to provide a nozzle of this class which is particularly compact so as to require a minimum amount of material for its construction;

Sixth, to provide a nozzle of this class which, although of short length, has a particularly large bearing area between the body member secured to the hose and the valve shifting shell so as to insure smooth operation and a liquid-tight seal therebetween;

Seventh, to provide a nozzle of this class in which, when the valve member is in use, only a portion of the fixed member and the head of the valve member is subjected to water pressure, so that with a proper seating of the valve, leakage is impossible;

Eighth, to provide a nozzle of this class in which, when in operation, water does not leak around the joint as the flow of water is contrary to the direction the water must take in order to leak past said joint; and Ninth, to provide on the whole a novelly constructed sprinkling nozzle which is particularly simple of construction proportional to its functions, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon, which form a part of this application, in which:

Figure 1 is a side elevational view of my sprinkling nozzle; Fig. 2 is an enlarged longitudinal sectional view thereof with parts and portions shown in elevation; Fig. 3 is an elevational view of the discharge end of the nozzle; Fig. 4 is an elevational view taken in the same direction as Fig. 3 with the valve shifting shell removed; and Fig. 5 is an elevational view of the traveler member, valve member, and jet regulating needle.

Similar characters of reference refer to similar parts and portions throughout the several views of the drawing.

Body member 1, valve shifting shell 2, traveler member 3, valve screw 4, and jet regulating needle 5 constitute the principal parts and portions of my sprinkling nozzle.

The body member 1 is provided with an end portion 1a, which is internally threaded so as to fit the conventional externally threaded hose fitting, not shown. Forwardly from the end portion 1a, the body member is provided with tubular extension 1b of reduced cross section forming with the end portion 1a an annular shoulder 1c, the rear surface of which forms a seat for a washer, not shown, used to form a sealed joint between the hose fitting and the body member.

Within the tubular extension, intermediate its ends, is formed a constriction 1d, the rear face of which forms a valve seat.

The outer periphery of the tubular extension forms a journal and is of two diameters, the extended portion 1e having the lesser diameter.

The extended journal portion 1e is provided with a pair of diametrically disposed slots 1f, which extend longitudinally therewith from the forward end of the tubular extension.

The shell 2 is provided with a bearing portion 2a at its rear end, which fits over the larger journal portion of the tubular extension.

The rear end of the valve shell 2 abuts the forward surface of the shoulder 1b, as shown in Fig. 2. At the rear end of the shell 2, there is provided a small outwardly extending annular ridge 2b. The body member 1 is provided with an overhanging annular portion 1g, which extends forwardly of the shoulder portion 1b so as to overhang the ridge 2b. The forward margin of the overhanging portion 1b is pressed inwardly, as indicated by 1h, so as to lock the shell 2 against longitudinal movement relative to the body member 1. The shell 2 is free to revolve, however.

The portion of the shell 2 fitting over the extended journal portion 1e of the body member 1 is provided with relatively coarse screwthreads 2c, preferably double-pitched threads. The ridges forming the screwthreads 2c are truncated so as to form bearing surfaces which may ride upon the journal portion 1e.

The traveler member 3 comprises a pair of diametrically extending arm portions 3a, which fit in the slots 1f. Their extended faces are provided with segmental screwthreads 3b corresponding to and adapted to fit in the screwthreads 2c. Supported by the arms in centered relation to the axis of the member 1, and extending longitudinally therewith, is the body portion 3c of the traveler member.

The rear end of the body portion 3c forms an internally threaded boss portion which receives the externally threaded end 4a of the valve screw 4. The valve stem 4b of the valve screw extends rearwardly from the traveler member 3 through the constriction forming the valve seat 1d. The extended rear end of the valve screw 4 is provided with a valve head 4c, having substantially the shape of a countersink screw, and is provided with a channel 4d in its outer end for receiving a screwdriver or the like.

The forward end of the body portion 3c forms a socket 3f, which is adapted to receive a ball portion 5a of the jet regulating needle 5. The jet regulating needle is retained in the socket by pressing the extended rim of the socket 3f inwardly, as shown in Fig. 2. The jet regulating needle 5 is thus capable of limited pivotal movement.

Forwardly of the screwthreaded portion 2b of the valve shell 2, said shell is provided with a constricted portion forming a discharge or nozzle orifice 2d. Forwardly of the orifice 2d, the inner walls of the shell member 2 expand, forming a substantially semispherical depression 2e, which assists the action of the orifice 2d.

The jet regulating needle is provided with a head portion 5b at its forward end, of slightly less diameter than the orifice 2d. The head 5b of the jet regulating needle is substantially conical in shape with the apex thereof blunted and pointing forwardly.

The exposed periphery of the body member 1 is knurled as indicated by 1j, as is also a portion of the sleeve 2, as indicated by 2f.

By reason of the ample bearing surfaces of the shell 2, which ride upon the journal portions of the body member 1, said members are in axial alinement at all times. Because of the double diameter of the journal portions of the tubular extension 1b and also by reason of the arrangement between the ridge 2b and the overhanging portion 1g of the body member 1 and shell member 2, water must follow a particularly tortuous path in order to leak out of the joint between these two members.

Operation of the nozzle is as follows:

The body member 1 is screwed upon the externally threaded member of a hose, then by turning the shell 2 the traveler member 3 is shifted forwardly or backwardly, varying the relative position of the jet regulating needle 5 and the jet 2d. For certain positions of the jet needle, a sharply defined jet of water may be thrown a considerable distance from the nozzle. In other positions, the water is caused to spray outwardly in a fan shape, and in still other positions, to discharge a large volume at relatively low pressure.

If it is desired to use the nozzle as a sealing valve, the shell 2 is turned so as to shift the traveler member 3 forwardly until the valve face 4c engages the valve seat 1d. With application of only a small turning moment upon the shell 2 it is possible to form a liquid-tight joint between the valve and its seat.

It will be noted that when the valve is seated, the only place where leakage is possible is through the valve or through the connection between the fixed member 1 and the hose coupling, and as the water pressure tends to hold the valve against its seat rather than forcing it away therefrom, the water pressure tends to turn the sleeve 2 in the direction which would cause a further tightening of the valve rather than causing it to loosen.

It is obvious from the construction as illustrated in the drawing and described in the foregoing specification that there is provided a sprinkling nozzle as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a sprinkling nozzle, a body member securable to a hose fitting, a tubular shank extending therefrom, a shell fitting over and journalling upon said shank, a traveler member supported wholly within the extremities of said shank, a jet orifice formed at one end of said shell member, and a jet regulating needle swivelly mounted on said traveler member and actuated by said shell for regulating the flow of water through said orifice.

2. In a sprinkling nozzle, a body member securable to a hose fitting, a tubular shank extending therefrom, a shell fitting over and journalling upon said shank, a traveler member supported wholly within the extremities of said shank, a jet orifice formed at the one end of said shell member, a jet regulating needle swivelly mounted on said traveler member and supported wholly by said traveller member and actuated by said shell for regulating the flow of water through said orifice, said tubular shank provided with a constricted portion forming a valve seat positioned on the opposite side of said traveler member from said jet orifice, and a valve arranged to coact with said seat and carried by said traveler member.

3. In a sprinkling nozzle, a tubular member securable at its one end to a hose coupling, said tubular member bifurcated longitudinally at its other end portion, a traveler means slidably mounted wholly between the legs forming said bifurcated portion, a cylinder fitting over the major portion of said tubular member, and rotatable thereon, internal screwthreads formed within said cylinder coinciding with said bifurcated portion, said screwthreads engageable with said traveler member, the inner peripheries of said screw threads arranged to ride upon said bifurcated portion so as to form a part of the bearing surfaces between said tubular member, and said cylinder, a nozzle means at the end of said cylinder remote from the secured end of said tubular member, and a jet needle swivelly mounted on said traveler member arranged to coact with said nozzle means.

4. In a sprinkling nozzle, a pair of overlapping tubular members, bearing and journal means formed by the overlapping portions of said tubular members, a traveler member mounted within said tubular members, means associated with one of said tubular members for confining said traveler member to axial movement within the extremities of said bearing and journal means, means associated with the other of said tubular members for shifting said traveler member axially, the one of said tubular members arranged to be attached to a hose fitting, the extremities of said tubular members forming nozzle inlet and outlet means, and a jet regulating needle carried by said traveler member arranged to coact with the outlet of said nozzle.

5. In a nozzle structure, a pair of overlapping revolubly associated tubular members, a traveler member mounted wholly within the overlapping portions of said tubular members, coacting means associated with said tubular members for shifting said traveler member axially upon relative revoluble movement of said tubular members, a constriction in one of said tubular members forming a valve seat, and a valve member arranged to fit said valve seat screwably mounted in said traveler member.

In testimony whereof, I have hereunto set my hand at San Diego, California, this 26th day of February, 1930.

MARTIN C. BERSTED.